United States Patent [19]

Piller et al.

[11] 4,407,569

[45] Oct. 4, 1983

[54] DEVICE FOR SELECTIVELY AVAILABLE PHASE-CONTRAST AND RELIEF OBSERVATION IN MICROSCOPES

[75] Inventors: Horst Piller, Aalen; Klaus Weber, Konigsbronn, both of Fed. Rep. of Germany

[73] Assignee: Carl Zeiss-Stiftung, Oberkochen, Fed. Rep. of Germany

[21] Appl. No.: 281,072

[22] Filed: Jul. 7, 1981

[51] Int. Cl.³ .............................................. G02B 21/14
[52] U.S. Cl. .................................. 350/509; 350/525; 350/526
[58] Field of Search ............... 350/509, 510, 525, 526, 350/527

[56] References Cited

U.S. PATENT DOCUMENTS

| 2,565,419 | 8/1951 | Aitcheson | 350/526 |
| 2,766,655 | 10/1956 | Pinkowski | 350/526 X |
| 3,637,280 | 1/1972 | Beyer et al. | 350/509 |

FOREIGN PATENT DOCUMENTS

| 1020837 | 11/1952 | France | 350/509 |
| 2379827 | 10/1978 | France | 350/509 |

*Primary Examiner*—John K. Corbin
*Assistant Examiner*—Matthew W. Koren
*Attorney, Agent, or Firm*—Hopgood, Calimafde, Kalil, Blaustein & Judlowe

[57] ABSTRACT

The invention contemplates a microscope construction, applicable both to reflected-light and to transmitted-light varieties, whereby an object under examination can be selectively observed for phase-contrast and for relief effect (so-called "contrast modulation"). A first diaphragm having the effective shape of a circular ring is selectively positionable concentric with the observation-ray path and at a first location conjugate to the image plane of the microscope objective; and at least two diaphragms are selectively positionable on the illumination-ray path at a second location conjugate to the image plane of the microscope objective. One of these latter two diaphragms is in the effective circular-ring shape of the observation-path diaphragm, and the other of these latter two diaphragms is a light-transmitting circular-ring segment.

13 Claims, 5 Drawing Figures

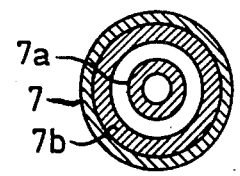
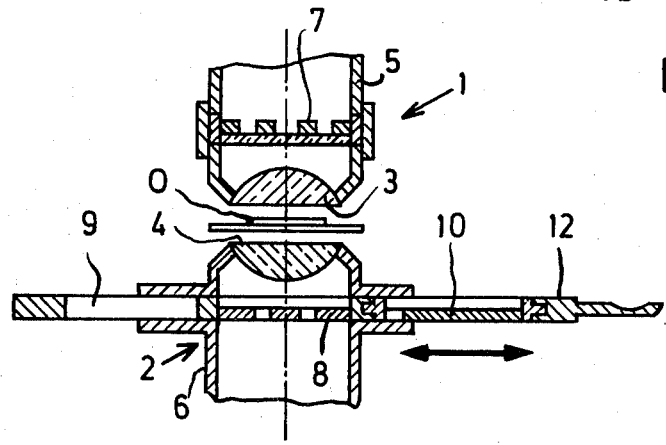
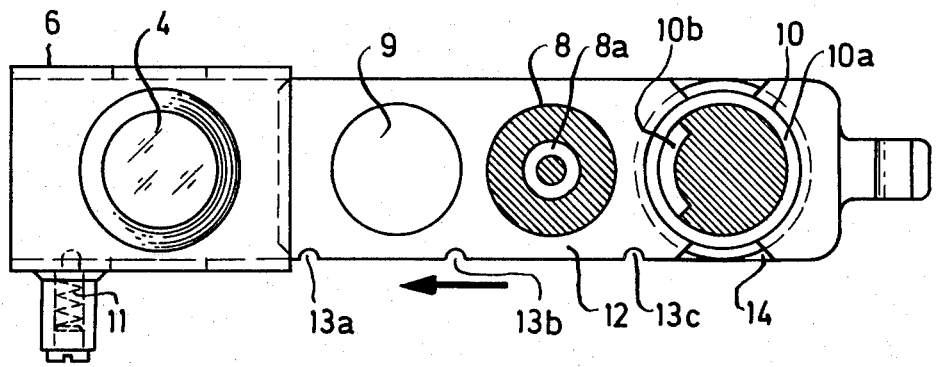

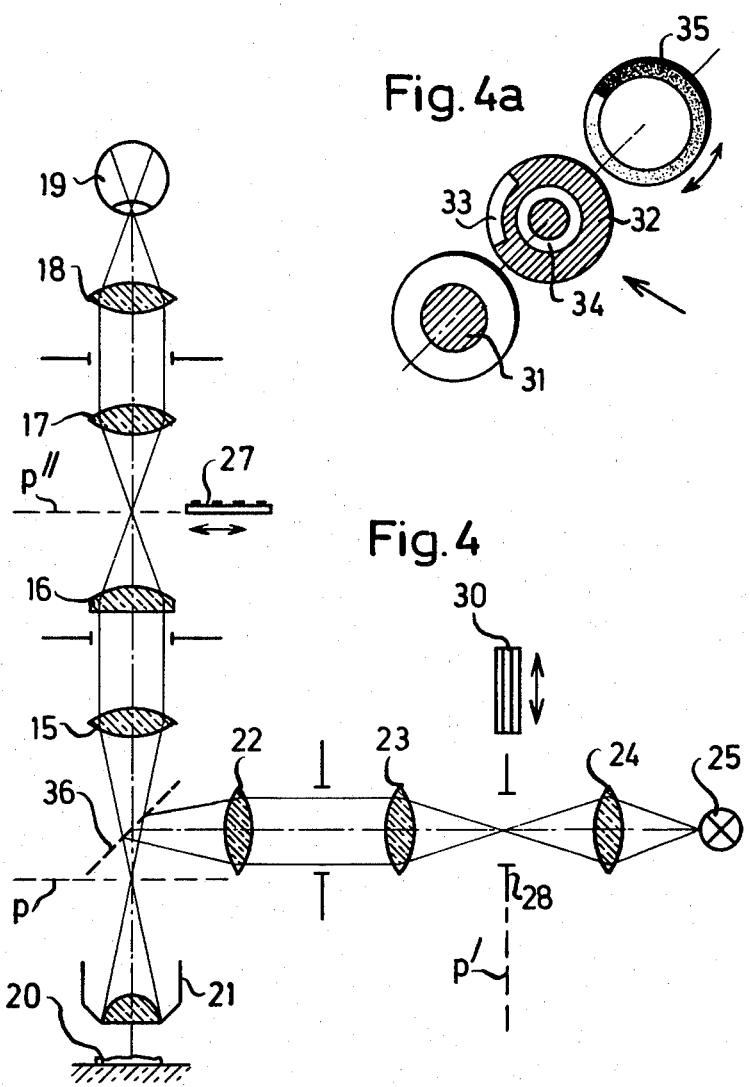

DEVICE FOR SELECTIVELY AVAILABLE PHASE-CONTRAST AND RELIEF OBSERVATION IN MICROSCOPES

BACKGROUND OF THE INVENTION

The present invention relates to a microscope device for selectively available phase-contrast and relief observation, employing phase and amplitude-varying layers arranged in a pupil plane in the observation ray path, and a diaphragm arranged in the illumination ray path.

Such devices, which are known as "phase contrast" devices are used for making visible certain non-absorbing structures of microscopic objects, such as structures of different index of refraction or of different thickness. Such structures of different optical thickness which are not perceptible by the eye are generally referred to as phase objects.

In order to make such objects visible, so-called "phase rings" are arranged in the observation ray path, generally directly in the exit pupil of the objective employed; corresponding diaphragms are imaged onto these rings, the diaphragms being arranged in conjugate planes of the illumination ray path. Such action on the phase or amplitude of the light associated with different orders of refraction, effectively masks out certain parts of the diffraction pattern established by projection of the source image and as limited by the diaphragms in the illumination ray path.

As the expression "phase ring" indicates, in customary phase-contrast devices such as those described in West German Pat. Nos. 636,168 and 974,173, amplitude and phase-varying shapes in the form of circular rings are applied to or etched on plates and/or optical elements of the objective in the vicinity of its pupil. The optical system of the microscope, consisting of condenser and objective, is used to project corresponding circular-ring diaphragms, usually arranged directly in the rear focal plane of the condenser, precisely onto the phase rings in the objective.

From West German Pat. No. 1,963,604, it is known, in the case of incident illumination, to develop the diaphragm and the phase ring as ring segments so as to be able to arrange both of them in the same plane, in the exit pupil of the objective, which acts at the same time as a condenser. In this situation, the centroid of light transmitted by the ring segments lies on the optical axis of the projecting objective.

West German published (Offenlegungsschrift) applications Nos. 2,523,463 and 2,523,464 describe a so-called "contrast modulation microscope" having a plate arranged in a pupil plane of the observation-ray path and having strip-shaped regions of different transparency. In this microscope, the diffraction pattern is not invaded symmetrically to the optical axis of the objective, and therefore the phase objects which are made visible by this microscope exhibit, in addition, a relief effect similar to that which occurs upon unilaterally oblique illumination of an object.

One disadvantage of the known "contrast modulation microscope" is that the strip-shaped regions of the modulator plate in the observation-ray path must be adapted very precisely in their angular position to the corresponding openings of the condenser diaphragm. This diaphragm or the modulator must therefore be rotatably mounted, for purposes of adjustment. If it is desired to examine the relief picture of a specimen as a function of azimuth, a rotating stage is also required for support of the specimen.

Since the phase rings of the first-mentioned contrasting method and the modulator of the last-mentioned contrasting method are, as a rule, arranged in the pupil of the objective, which, in the case of a very large number of objectives, may lie in the inaccessible interior, and in part even within the lens components, these two contrasting methods are generally not compatible with each other, since a separate series of objectives must be produced for the two systems, each such objective containing the phase ring or modulator, as the case may be, permanently installed therein. The results in a high expense.

BRIEF STATEMENT OF THE INVENTION

It is an object of the present invention to provide a microscope device for displaying phase objects which makes it possible, without great expense, to selectively display the corresponding objects in both known methods of contrasting, i.e., with and without relief effect.

Another object is to meet the above object within the optical system of an existing microscope.

A further object is to meet the above objects without requiring any lens change.

The invention achieves these objects by providing the layer which is arranged in the observation-ray path in the shape of at least one concentric circular ring whose outer diameter corresponds essentially to the diameter of the corresponding pupil, and by providing in the illumination-ray path at least two diaphragms which can be selectively brought into action, one of said diaphragms having the shape of a circular ring and the other being developed as a light-transmitting circular ring segment.

The advantage which can be obtained in this way is that by simple selectively indexed positioning of diaphragms in the illumination-ray path, and using the same objective, object displays are available both in the conventional (pure) phase-contrast manner and by the so-called modulation-contrast method. In addition, no angular adjustment between diaphragm and modulator is necessary.

If the diaphragm which is developed as a circular ring segment is rotatably supported, then the relief display of the unilaterally obliquely illuminated object can be examined in very simple manner as a function of azimuth, without need for rotary manipulation of the object itself.

DETAILED DESCRIPTION

The invention will be illustratively described in detail, in conjunction with the accompanying drawings, in which:

FIG. 1 is a diagrammatic vertical sectional view through the objective and condenser of a transmitted-light microscope, taken in the plane of the optical axis;

FIG. 2 is a diagrammatic showing of a phase ring arranged in the objective of FIG. 1;

FIG. 3 is a plan view of the condenser of FIG. 1;

FIG. 4 is an optical diagram of the ray path of a reflected-light microscope in accordance with another embodiment of the invention; and FIG. 4a diagrammatically shows the construction of successive diaphragms in the illumination of ray path of FIG. 4.

The part of a transmitted-light microscope shown in FIG. 1 consists of an objective unit 1 and a condenser unit 2, the optical members of these units being shown in simplified form as individual lenses 3 and 4, mounted respectively in housings 5 and 6.

In the rear focal plane of objective 1 is a plate 7 which is merely partially light-transmitting and which, as shown in FIG. 2, includes two concentric ring-shaped material layers 7a and 7b, respectively affecting the phase and the amplitude of transmitted light.

The condenser unit 2 includes a slide 12 which has three indexible positions, and a spring detent 11 carried by the condenser housing 6 engages in corresponding depressions 13a, b, c in the slide 12, for retention of each selected index position. The slide 12 carries three different selectively available diaphragms 8, 9 and 10. Diaphragm 9 frees the entire entrance pupil of the optical system formed of condenser and objective and permits bright-field observation.

Diaphragm 8 has a ring-shaped light-transmitting region 8a which is projected by condenser 4 and objective 3 onto the phase ring 7a of plate 7 and serves for pure phase-contrast display of an object 0 present between the lenses 3 and 4.

Diaphragm 10 is light-transmitting only in a region 10b having the shape of a ring segment, which region is projected onto the ring 7b. The diaphragm is furthermore mounted in a ring 10a which is rotatable within slide 12 and is accessible to the user at cut-out locations 14 in slide 12, for the user's finger manipulation of ring 10a.

Light which passes through the segment 10b traverses the object plane within a limited arc of azimuth about the optical axis reduced in amplitude by the ring 7b. As a result of the unilaterally oblique angle at which the light passes through the object plane, a relief effect occurs which allows the object to appear three-dimensionally. The dependence of this effect on azimuth can be investigated by turning the ring 10a.

The change from one to the other method of contrasting is effected merely by inserting the corresponding diaphragm 8 or 10 into the condenser 2, without need for any change in the objective unit 1.

FIG. 4 illustrates another embodiment of the invention, involving a reflected-light ray path, wherein an object 20 is illuminated by a source of light 25 via an optical system 22-23-24 and a semi-transmitting mirror 36 through the objective 21. Within this system is a combined ring/ring segment diaphragm 30, described in further detail in FIG. 4a, in the plane p' which is conjugate to the focal plane p of the microscope objective 21.

The phase ring is positioned on a glass plate 27 in a second plane p", also conjugate to the focal plane p, and within the observation ray path formed by the optical system 15-16-17-18. Plate 27 can be swung out of the ray path so as not to impair the aperture and thus not to impair resolving power, in the case of bright-field observation. The arrangement of phase-varying rings on plate 27 is the same as in FIG. 2.

Referring now to FIG. 4a, the diaphragm combination 30 consists of a support 32 which bears both a ring diaphragm 34 and a ring-segment diaphragm 33. Over the support 32, there is a gray wedge 35 which rotatably covers the ring segment 33, while the ring diaphragm 34 is covered by a color filter 31.

When the filter combination 30 and the plate 27 are swung into the ray path, the user 19 has a reflected-light view of the object 30 in conventional phase contrast, in the color determined by the filter 31 (for example green). Superposed on this view is a relief display of the object 20, based on oblique illumination through the segment diaphragm 33, the intensity of which will be understood to be selectively and continuously varied by the gray wedge 35, to the point of complete mask-out.

In the device of FIG. 4, an intermediate image of the objective pupil is formed, and the locus of the intermediate image is relatively easily accessible. Therefore, it is readily possible to arrange, as on a turret, other plates in addition to plate 27, each such other plate having only one ring.

By selectively indexing these plates into position on the optical axis, it is then possible, in combination with suitable diaphragms in the illumination ray path, to observe the object not only in the combined display but also optionally in pure phase contrast or in pure relief display, without aperture losses.

What is claimed is:

1. In a microscope, illumination-optical means establishing an illumination-ray path, an objective and observation-optical means establishing an observation-ray path, a first pupil plane in the illumination-ray path conjugate to a second pupil plane in the observation-ray path, a phase-contrast layer positioned in said second pupil plane, said phase-contrast layer having the configuration of at least one circular annulus concentric with the axis of the observation-ray path at said second pupil plane, the outer diameter of said annulus being of effectively pupil-entrance size at said second plane, and selectively operable means including at least two diaphragms of different configuration at said first pupil plane, one of said two diaphragms having the shape of a circular annulus, and the other of said two diaphragms being a light transmitting circular-ring segment.

2. The microscope of claim 1, in which said selectively operable means includes a slide mounting said two diaphragms in spaced relation and selectively positionable to place a selected one of said two diaphragms on the illumination-ray path.

3. The microscope of claim 1, in which said other diaphragm is rotatable about the geometrical center of the circular ring segment.

4. The microscope of claim 1, in which said selectively operable means mounts said two diaphragms in superposed relation, and in which at least said other diaphragm is rotatable about the geometrical center of the ring segment.

5. The microscope of claim 1, in which the configuration of said phase-contrast layer comprises two concentric circular rings.

6. The microscope of claim 1, wherein the optical means of the illumination-ray path includes a condenser and wherein said first pupil plane is in the rear focal plane of the condenser.

7. The microscope of claim 6, in which said selectively operable means at the first pupil plane is a slide having separate openings at which said two diaphragms are respectively mounted, said slide having an additional free opening for bright-field illumination.

8. The microscope of claim 7, in which a color filter is positioned behind one of the diaphragms.

9. The microscope of claim 6, in which said selectively operable means at the first pupil plane is an indexible turret, with said two diaphragms respectively mounted for illumination-ray path positioning at different indexed positions of said turret.

10. The microscope of claim 1, in which a semi-transparent mirror folds one of said ray paths into the other for common use of said objective, at a location intermediate said objective and said respective pupil planes, said pupil planes being conjugate to the rear focal plane of the objective.

11. The microscope of claim 10, in which said phase-contrast layer is a plate that is indexible in a plane conjugate to the focal plane of said objective.

12. The microscope of claim 1, in which a rotatable gray wedge is positioned adjacent the circular-ring-segment diaphragm.

13. The microscope of claim 12, in which the circular-annulus diaphragm and the circular-ring-segment diaphragm and the rotatable gray wedge are positioned in superposed adjacency.

* * * * *